United States Patent [19]

Gardenhour, Jr. et al.

[11] Patent Number: 5,217,240
[45] Date of Patent: Jun. 8, 1993

[54] TRICYCLE PUSH STICK

[76] Inventors: Charles E. Gardenhour, Jr., 3126 Belleview Ave., Cheverly, Md. 20785; Christopher E. Gardenhour, 6125 43rd St., Riverdale, Md. 20737

[21] Appl. No.: 820,773

[22] Filed: Jan. 15, 1992

[51] Int. Cl.$^5$ .................. B62H 7/00; B62K 9/02
[52] U.S. Cl. .................. 280/282; 280/47.34; 280/47.371; 294/19.1; 294/26
[58] Field of Search .................. 294/15, 17, 18, 19.1, 294/26, 92; 16/111 R, 114 R; 104/202; 254/35, 36, 131 R, 133; 280/24, 47.11, 47.17, 47.18, 47.25, 47.315, 47.34, 47.371, 47.38, 62, 210, 230, 288.4, 292, 304.5, 480–482, 282, 293

[56] References Cited

U.S. PATENT DOCUMENTS

| | | | |
|---|---|---|---|
| 922,914 | 5/1909 | Kingsbury | 280/47.11 |
| 1,031,964 | 7/1912 | Reinehr | 294/15 |
| 1,551,214 | 8/1925 | Perrel | 294/92 |
| 2,391,608 | 12/1945 | Wood | 294/19.1 |
| 2,617,363 | 11/1952 | Anketell | 104/202 |
| 2,672,351 | 3/1954 | Kane | 280/47.34 X |
| 2,816,775 | 12/1957 | Costello | 280/288.4 |
| 2,997,327 | 8/1961 | Bjalme | 294/92 |
| 4,659,124 | 4/1987 | Hillman | 294/19.1 |
| 4,750,252 | 6/1988 | Homeyer | 294/19.1 X |
| 5,028,066 | 7/1991 | Garth | 280/47.11 X |

OTHER PUBLICATIONS

U.S. Bureau of Mines Investigation Reports, R.I. 3984, one sheet of drawing—FIG. 2, May 1947.

Primary Examiner—Johnny D. Cherry
Attorney, Agent, or Firm—Aquilino & Welsh

[57] ABSTRACT

A tricycle push stick for attachment to a tricycle frame for pushing or pulling, the device having an elongated member with a handle mounted at one end and a releasable attachment member mounted at the other end wherein the releasable attachment member is in the form of an opening and an angular slot cooperating with the opening to allow the frame of a tricycle into the opening at a predetermined angle.

14 Claims, 2 Drawing Sheets

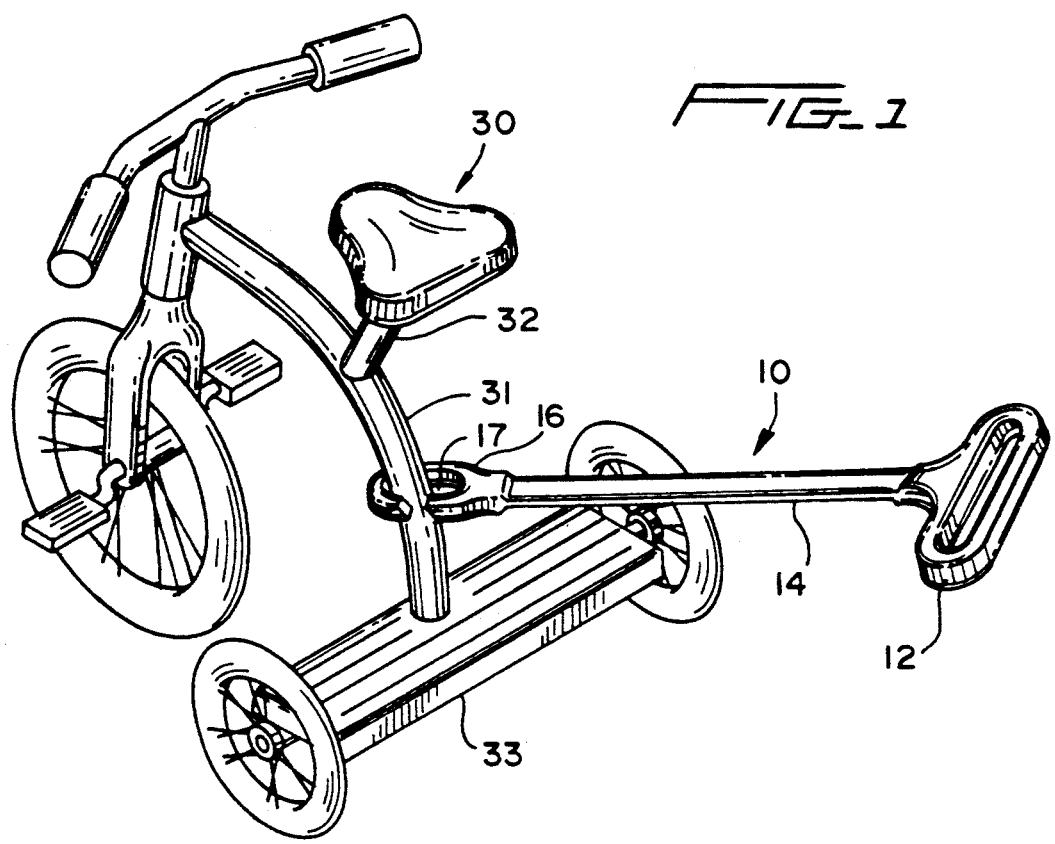
FIG_1
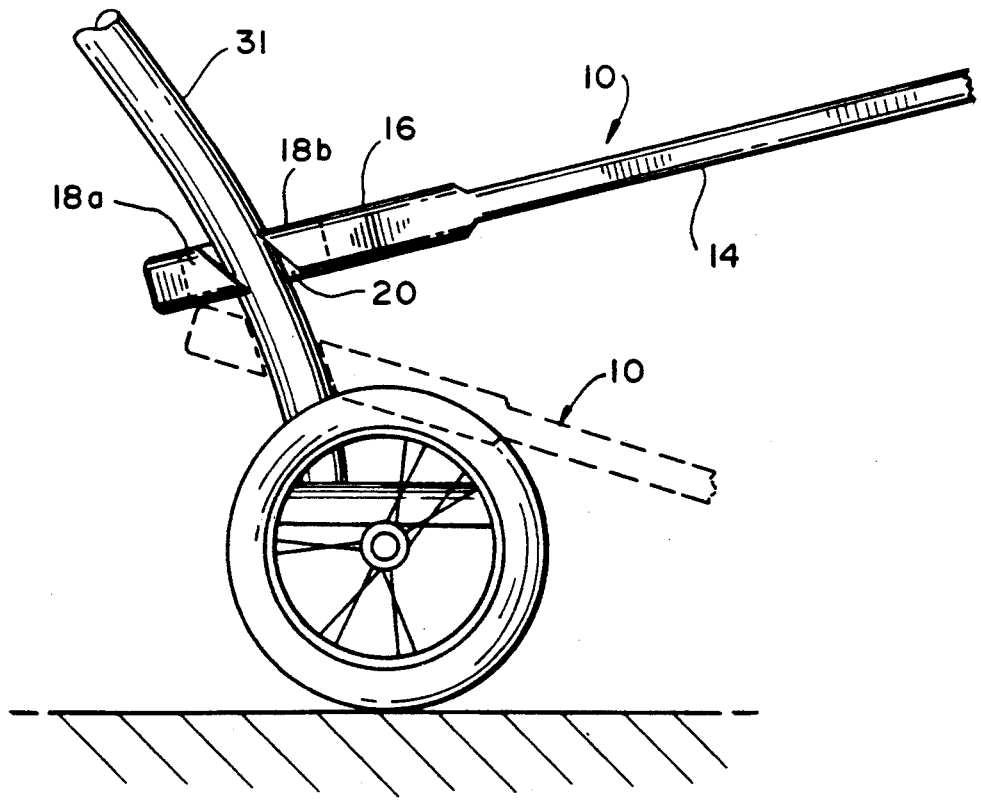
FIG_2

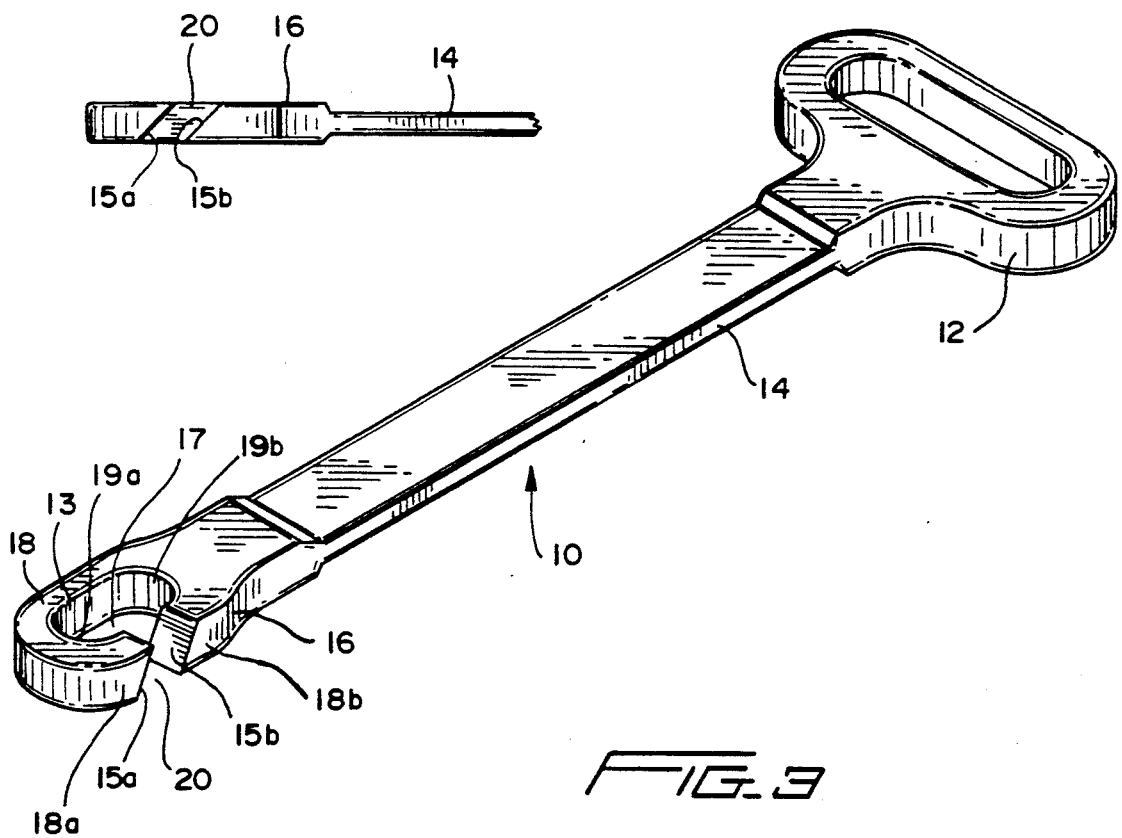

TRICYCLE PUSH STICK

BACKGROUND OF THE INVENTION

The present invention relates to a training accessory for a tricycle, and more particularly, a handle attachment for pushing or pulling a tricycle.

The prior art has recognized the need for tricycle pushing implements as shown by the patents to Garth (U.S. Pat. No. 5,028,066) and Christof (U.S. Pat. No. 3,485,507). However, these pushing implements are securely mounted to a specific tricycle, and thus are not universal, that is, attachable to numerous styles of tricycles. In being securely mounted, these pushing poles do not allow for easy removability, thus making the tricycle awkward and a burden to store. Further, these pushing poles do not allow for adjustment to accommodate differently sized users.

While many toys have come and gone, the demand for tricycles still remains, which has created numerous styles of tricycles. One thing these numerous styles of tricycles all seem to have in common is a cylindrical, longitudinal main frame from which the seat projects. This common feature of a cylindrical main frame is what has led to the present development of a universal push/pull stick for a child's tricycle.

In the process of learning how to ride a tricycle, a child must develop coordination skills and have adequate size and strength to reach and propel the pedals. Therefore, during the initial stage of learning, a parent often does most of the pushing, usually by bending over to push the tricycle or imparting a force to the frame with his foot. Pushing with one's foot causes a jerking motion to the child, which is not only uncomfortable to the child, but is also dangerous, as it may throw the child from the seat. Thus, an implement to push the tricycle at the initial stage would be beneficial to both parent and infant. Once the child has the proper skills, size and strength, he usually lacks the endurance to go distances, such as walks around the block with the family, and again the parent must aid in pushing the tricycle.

Therefore, a need exists to provide a push stick which is attachable to almost any type of tricycle, and once attached, will not disengage from the tricycle while in use.

SUMMARY OF THE INVENTION

The tricycle push stick of the present invention includes an elongated member with a handle mounted at one end and a universal tricycle frame attachment mounted at its other end.

It is the primary objective of the present invention to provide a push stick which will aid in the development of an infant's process of learning to ride a tricycle.

Another object of this invention is to provide a tricycle push stick having a universal frame attachment that is safe, in that it is configured to releasably engage the main frame of a tricycle, but will not release engagement while in use.

Still another object of the invention is to provide an attachment which is simple to use and attachable to almost any style of tricycle.

A further object of the invention is to provide a tricycle push stick which can be used to push the tricycle forward, pull the tricycle backward and can also be used to restrain the forward motion of the tricycle, thereby preventing a child from getting too far ahead of a parent while walking or rolling down a hill out of control.

These as well as other objectives will become more apparent as the description of the invention proceeds.

BRIEF DESCRIPTION OF THE DRAWINGS

FIG. 1 is a perspective view of the device in operation.

FIG. 2 is an exploded side view of FIG. 1.

FIG. 3 is a perspective view of the invention showing the slot at a different angle than that shown in FIGS. 1 and 2.

FIG. 4 is a partial side view of FIG. 3.

DESCRIPTION OF THE PREFERRED EMBODIMENTS

FIG. 1 shows a perspective view of the tricycle push stick 10 in combination with a conventional tricycle 30 having a main frame 31. The push stick 10 includes a handle 12, an elongated member 14 and a releasable attachment member 16.

The handle 12 is integrally formed with or connected to the elongated member 14 at one end thereof. The handle 12 can take many shapes, but the preferred shape is one that forms a "T" with the elongated member 14.

The elongated member 14 is rigid and can vary in its length and shape, the length falling within the range of between 1 to 4 feet, with the preferred length being approximately 2½ feet.

The releasable attachment member 16 is generally hook-like in configuration. It is integral with or connected to the elongated member 14 at an end opposite the handle 12. The handle 12, elongated member 14 and releasable attachment member 16 can be made from any suitable material, such as plastic, metal or wood. As can be seen in the figures, the thickness of the releasable attachment member 16 is greater than the thickness of the elongated member 14.

As best shown in FIG. 3, a preferred embodiment of the releasable attachment member 16 includes an oval shaped opening 17 with sides 13, the releasable attachment member having side legs 18 larger than the circumferential dimension of the tricycle main frame 31 and rounded ends 19a, 19b slightly larger than the circumferential dimensions of the tricycle main frame 31. It will be appreciated that the opening 17 can be of various shapes as long as its dimensions are larger than that of the tricycle main frame 31. One of the side legs 18 includes a slot 20, which forms separate angular legs 18a and 18b with tapered ends 15a and 15b. The slot 20 is angled with the preferred angle being approximately 135° with reference to the longitudinal axis of the elongated member 14. The angle and the width of slot 20 are such that when the push stick is properly positioned, as shown by dotted lines in FIG. 2, the slot 20 will slide over the main frame 31, allowing main frame 31 to be retained with opening 17. Once the push stick is moved into an operative position, as shown by solid lines in FIG. 2, the main frame 31 is unable to slide back through the angled slot 20 as tapered legs 18a and 18b impede lateral movement.

The embodiment shown in FIGS. 3 and 4 has a slot 20 which is angled at approximately 45° with reference to the longitudinal axis of the elongated member 14, thus depicting that the angle of the slot 20 can vary depending upon the tricycle main frame 31.

In operation, the tricycle push stick 10 is tilted to an angle such that the angle of the slot 20 corresponds with the angle of the main frame 31, as shown by dotted lines in FIG. 2, thereby allowing the releasable attachment member 16 to be slid over the main frame 31 in order to retain the main frame 31 within opening 17. The push stick is then tilted into an operative position, as shown in FIG. 2 by solid lines, such that the angle of the slot 20 no longer corresponds to the angle of the main frame 31, thereby preventing the tricycle push stick from becoming disengaged with the main frame 31. The user is then confident that the push stick 10 will not disengage from the main frame 31. The user has control over a child riding the tricycle, as he can push the tricycle when rounded end 19b engages the main frame 31 and pull the tricycle when rounded end 19a is engaged by the main frame 31. The range of movement of the push stick 10 along the main frame 31 is from seat support 32 to rear axle plate 33, thereby allowing the user to adjust the level of the push stick to a desired height.

While various preferred embodiments have been shown and described, it will be understood that there is no intent to limit the invention by such disclosure but, rather, it is intended to cover all modifications and alternate constructions falling within the spirit and scope of the invention as defined in the appended claims.

We claim:

1. A tricycle push stick for attachment to a tricycle frame for pushing or pulling, comprising:
   an elongated member having a longitudinal axis;
   a handle mounted at one end of said elongated member;
   a releasable attachment member fixedly mounted at the other end of said elongated member;
   said releasable attachment member including an elongated opening having a longitudinal axis parallel to the longitudinal axis of said elongated member and an angled slot cooperating with said opening which allows the frame of the tricycle into the opening only when the angle of the tricycle frame is the same as the angle of the slot, thereby preventing unintentional disengagement of the tricycle from the push stick during use.

2. The tricycle push stick of claim 1 wherein said releasable attachment member includes side legs and said angled slot is located in one of said side legs.

3. The tricycle push stick of claim 2 wherein the angle of said slot is either approximately 45 degrees or 135 degrees with reference to the longitudinal axis of said elongated member.

4. The tricycle push stick of claim 1 wherein said opening is in the form of an oval.

5. The tricycle push stick of claim 4 wherein the angle of said slot is either approximately 45 degrees or 135 degrees with reference to the longitudinal axis of said elongated means.

6. The tricycle push stick of claim 1 wherein the thickness of said releasable attachment member is greater than the thickness of said elongated member.

7. The tricycle push stick of claim 1 wherein the releasable attachment member is integrally formed with the elongated member.

8. A tricycle in combination with a push stick for attachment to the tricycle frame for pushing or pulling, comprising:
   an elongated member having a longitudinal axis;
   a handle mounted at one end of said elongated member;
   a releasable attachment member mounted at the other end of said elongated member;
   said releasable attachment member includes side legs, an opening and an angled slot in one of said side legs cooperating with said opening which allows the frame of the tricycle into the opening only when the angle of the tricycle frame is the same as the angle of the slot, thereby preventing unintentional disengagement of the tricycle from the push stick during use.

9. The tricycle push stick of claim 8 wherein said opening is in the form of an oval.

10. The tricycle push stick of claim 8 wherein the angle of said slot is either approximately 45 degrees or 135 degrees with reference to the longitudinal axis of said elongated member.

11. The tricycle push stick of claim 8 wherein the thickness of said releasable attachment member is greater than the thickness of said elongated member.

12. A tricycle push stick for attachment to a tricycle frame for pushing or pulling, comprising
   an elongated member having a longitudinal axis;
   a handle mounted at one end of said elongated member;
   a universally adaptable attachment member rigidly mounted at the other end of said elongated member;
   said universally adaptable attachment member including an elongated opening having a longitudinal axis parallel to the longitudinal axis of said elongated member and an angled slot located in a side leg of said attachment member to cooperate with said opening to allow the frame of the tricycle into the opening only when the angle of the tricycle frame is the same as the angle of the slot, thereby preventing unintentional disengagement of the tricycle from the push stick during use.

13. The tricycle push stick of claim 12 wherein the angle of said slot is either approximately 45 degrees or 135 degrees with reference to the longitudinal axis of said elongated means.

14. The tricycle push stick of claim 12 wherein the thickness of said universally adaptable attachment member is greater than the thickness of said elongated member.

* * * * *